United States Patent
Okonogi et al.

(10) Patent No.: US 8,133,949 B2
(45) Date of Patent: Mar. 13, 2012

(54) SEPARATOR AND SEPARATOR SEAL FOR POLYMER ELECTROLYTE FUEL CELLS

(75) Inventors: Daisuke Okonogi, Wako (JP); Satoru Terada, Wako (JP); Noriyuki Meguriya, Annaka (JP); Osamu Hayashida, Annaka (JP)

(73) Assignees: Honda Motor Co., Ltd., Tokyo (JP); Shin-Etsu Chemical Co., Ltd., Tokyo (JP)

(*) Notice: Subject to any disclaimer, the term of this patent is extended or adjusted under 35 U.S.C. 154(b) by 531 days.

(21) Appl. No.: 12/328,261

(22) Filed: Dec. 4, 2008

(65) Prior Publication Data

US 2009/0148748 A1 Jun. 11, 2009

(30) Foreign Application Priority Data

Dec. 7, 2007 (JP) ................. 2007-317448

(51) Int. Cl.
*C08L 83/00* (2006.01)
*H01M 2/02* (2006.01)

(52) U.S. Cl. .......................... 524/493; 429/35

(58) Field of Classification Search .................. 524/493; 429/35
See application file for complete search history.

(56) References Cited

U.S. PATENT DOCUMENTS

| | | | |
|---|---|---|---|
| 3,864,305 A * | 2/1975 | Jordan et al. | ................... 524/496 |
| 5,447,987 A | 9/1995 | Sato et al. | |
| 6,153,326 A | 11/2000 | Matsukawa et al. | |
| 7,087,338 B2 | 8/2006 | Meguriya et al. | |
| 7,482,403 B2 | 1/2009 | Meguriya et al. | |
| 2004/0096723 A1 | 5/2004 | Debe et al. | |
| 2004/0097640 A1 * | 5/2004 | Meguriya et al. | ............. 524/588 |

FOREIGN PATENT DOCUMENTS

| | | |
|---|---|---|
| JP | 62-34968 A | 2/1987 |
| JP | 7-228781 A | 8/1995 |
| JP | 8-176445 A | 7/1996 |
| JP | 11-129396 A | 5/1999 |
| JP | 11-309747 A | 11/1999 |
| JP | 2002-309092 A | 10/2002 |
| JP | 2003-267455 A | 9/2003 |
| JP | 2004-014150 A | 1/2004 |
| JP | 2006-506798 A | 2/2006 |
| JP | 2007-146147 A | 6/2007 |
| JP | 2007-214019 A | 8/2007 |
| WO | WO-2004-055932 A2 | 7/2004 |

OTHER PUBLICATIONS

Japanese Office Action for application No. 2007-317420, dated Jan. 27, 2010.

* cited by examiner

*Primary Examiner* — Ling Choi
*Assistant Examiner* — Chun-Cheng Wang
(74) *Attorney, Agent, or Firm* — Birch, Stewart, Kolasch & Birch, LLP

(57) ABSTRACT

Disclosed is a rubber composition for separator seal, comprising (A) a mixture of two or more alkenyl-containing liquid organopolysiloxanes having different weight average molecular weights, (B) an organohydrogenpolysiloxane, (C) fumed silica having a BET specific surface area of 50-400 $m^2/g$, (D) carbon black having a BET specific surface area of 30 to 120 $m^2/g$, an iodine adsorption value of 30 to 120 mg/g, and a DBP absorption value of 100 to 200 ml/100 g, and (E) an addition reaction catalyst cures into a product which is useful as a separator seal in PEFCs.

15 Claims, 7 Drawing Sheets

SEPARATOR AND SEPARATOR SEAL FOR POLYMER ELECTROLYTE FUEL CELLS

CROSS-REFERENCE TO RELATED APPLICATION

This non-provisional application claims priority under 35 U.S.C. §119(a) on Patent Application No. 2007-317448 filed in Japan on Dec. 7, 2007, the entire contents of which are hereby incorporated by reference.

TECHNICAL FIELD

This invention relates to separators and separator seals for use in polymer electrolyte fuel cells (PEFC) featuring compactness and more particularly, to separators and separator seals for PEFC which have a long service life and ease of molding.

BACKGROUND ART

The fuel cell is capable of producing electricity without a substantial need for fossil fuel that poses concerns about resource depletion, without noise, and at a high energy recovery rate as compared with other energy-based power generating systems. Great efforts have been made to exploit the fuel cell as a power generating plant of relatively compact size in buildings and factories, with some cells having been commercially implemented. In particular, polymer electrolyte fuel cells (PEFC) can operate at lower temperature than fuel cells of other types. The PEFC then draws attention not only as a device for household co-generation, but also as the replacement power source for internal combustion engines on vehicles because of the minimized corrosion concern regarding the materials of which cell components are made and their ability to discharge relatively high current flow despite low temperature operation. The PEFC is constructed of electrolyte membranes, separators and other components. The separator is generally a plate which is provided with a plurality of parallel channels on one surface or both surfaces. The separator plays the role of conducting the electricity produced at the gas diffusion electrode within the fuel cell to the exterior, discharging water produced within the channels in the course of electricity generation, and securing the channels as a flow path for incoming reaction gas to the fuel cell. Such a fuel cell separator is required to be more compact in size. Since a multiplicity of separators are used in stack, there is a demand for a separator seal material having durability and long term service.

As the separator sealing material, packing materials based on various resins have been under study. Among them, sealing materials based on silicone rubber are often used for their moldability, heat resistance and elasticity. JP-A 11-129396 and JP-A 11-309747 disclose silicone rubber compositions of the addition cure type featuring easier molding than conventional silicone rubbers. Silicone rubbers obtained by curing these compositions have been used, but are still unsatisfactory in maintaining elasticity over a long term. In particular, for improving the seal performance in acidic aqueous solution which is requisite as the packing material for fuel cell separators, it was necessary to minimize the amount of reinforcing fillers such as fumed silica. Regrettably, reducing the amount of reinforcing fillers gives rise to several problems such as reduced strength of cured rubber, difficulty of molding, and failure of seals. These problems can be solved using a mixture of a silicone fluid having alkenyl groups at ends of the molecular chain and a silicone fluid having alkenyl groups on side chains as disclosed in JP-A 2003-257455. For the sealing material for PEFC separators, not only rubber strength and low compression set, but also adhesion to the separator substrate are important factors. JP-A 2004-14150 describes a silicone rubber having minimal compression set in long-life coolant (LLC) as an exemplary gasket material for carbon separators, but refers nowhere to the adhesion of the silicone rubber. JP-A 2007-146147 describes a primer to be applied prior to integral molding of silicone rubber to a substrate to form a fuel cell separator. The rubber material is only described therein as being of the addition cure type, with no reference to its detail.

SUMMARY OF THE INVENTION

An object of the invention is to provide a separator seal for use in polymer electrolyte fuel cells, which is made of cured rubber having reduced compression set, high strength and good adhesion to separator substrates; and a separator having the seal formed at the periphery of a separator substrate.

The inventors have found that a rubber composition comprising (A) a mixture of two or more alkenyl-containing liquid organopolysiloxanes having different weight average molecular weights, (B) an organohydrogenpolysiloxane containing at least three silicon-bonded hydrogen atoms in a molecule, (C) fumed silica having a BET specific surface area of 50 to 400 $m^2/g$, (D) carbon powder, and (E) an addition reaction catalyst cures into a product which can be used as a separator seal, and that the resultant separator seal exerts excellent seal performance over a long term because the rubber has a reduced compression set even in an acidic atmosphere created by an electrolyte membrane or in contact with LLC, and the rubber itself has high strength, good moldability and good adhesion to separator substrates.

Accordingly, in one aspect, the present invention provides a separator seal for use in polymer electrolyte fuel cells which is formed of a sealing composition in the cured state, said sealing composition comprising (A) 100 parts by weight of a liquid organopolysiloxane containing at least two alkenyl groups each attached to a silicon atom in a molecule, (B) 0.5 to 20 parts by weight of an organohydrogenpolysiloxane containing at least three hydrogen atoms each attached to a silicon atom in a molecule, (C) 10 to 30 parts by weight of fumed silica having a BET specific surface area of 50 to 400 $m^2/g$, (D) 0.1 to 3 parts by weight of carbon powder, and (E) a catalytic amount of an addition reaction catalyst, the alkenyl-containing liquid organopolysiloxane (A) being a mixture of at least two liquid organopolysiloxanes having different weight average molecular weights.

Preferably, in the alkenyl-containing liquid organopolysiloxane (A), at least 90 mol % of the entire organic groups attached to silicon atoms are methyl; and a molar ratio of Si—H groups in component (B) to alkenyl groups in component (A), [Si—H/alkenyl], is between 0.8:1 and 5.0:1.

The at least two liquid organopolysiloxanes having different weight average molecular weights includes a first liquid organopolysiloxane (A-1) which is present in the greatest amount and a second liquid organopolysiloxane (A-2) which is present in the second greatest amount. The first and second liquid organopolysiloxanes have a weight average molecular weight Mw(A-1) and Mw(A-2), respectively. In one preferred embodiment, the weight average molecular weights Mw(A-1) and Mw(A-2) of the first and second liquid organopolysiloxanes fall in the range: $2 \leq Mw(A-2)/Mw(A-1) \leq 10$.

In another preferred embodiment, the first liquid organopolysiloxane has a weight average molecular weight Mw(A-1) of 10,000 to less than 30,000 and the second liquid organopolysiloxane has a weight average molecular weight Mw(A-2) of 30,000 to 100,000.

Typically the carbon powder (D) comprises carbon black having a BET specific surface area of 30 to 120 m²/g, an iodine adsorption value of 30 to 120 mg/g, and a DBP absorption value of 100 to 200 ml/100 g.

In another aspect, the present invention provides a separator for use in PEFCs comprising a substrate comprising a metal thin plate or a conductive powder and a binder and a seal formed at a periphery on at least one surface of the substrate, the seal comprising a cured product of the sealing composition.

BENEFITS OF THE INVENTION

The sealing composition of the invention cures into a rubber product which undergoes a reduced compression set even in an acidic atmosphere created by an electrolyte membrane or in contact with LLC, and which has a high strength in itself, ease of molding and good adhesion to separator substrates so that it exerts excellent seal performance over a long term. It is best suited as a separator seal for use in PEFCs.

BRIEF DESCRIPTION OF THE DRAWINGS

In the following description, like reference characters designate like or corresponding parts throughout the several views shown in the figures.

DESCRIPTION OF THE PREFERRED EMBODIMENT

Figure 1:
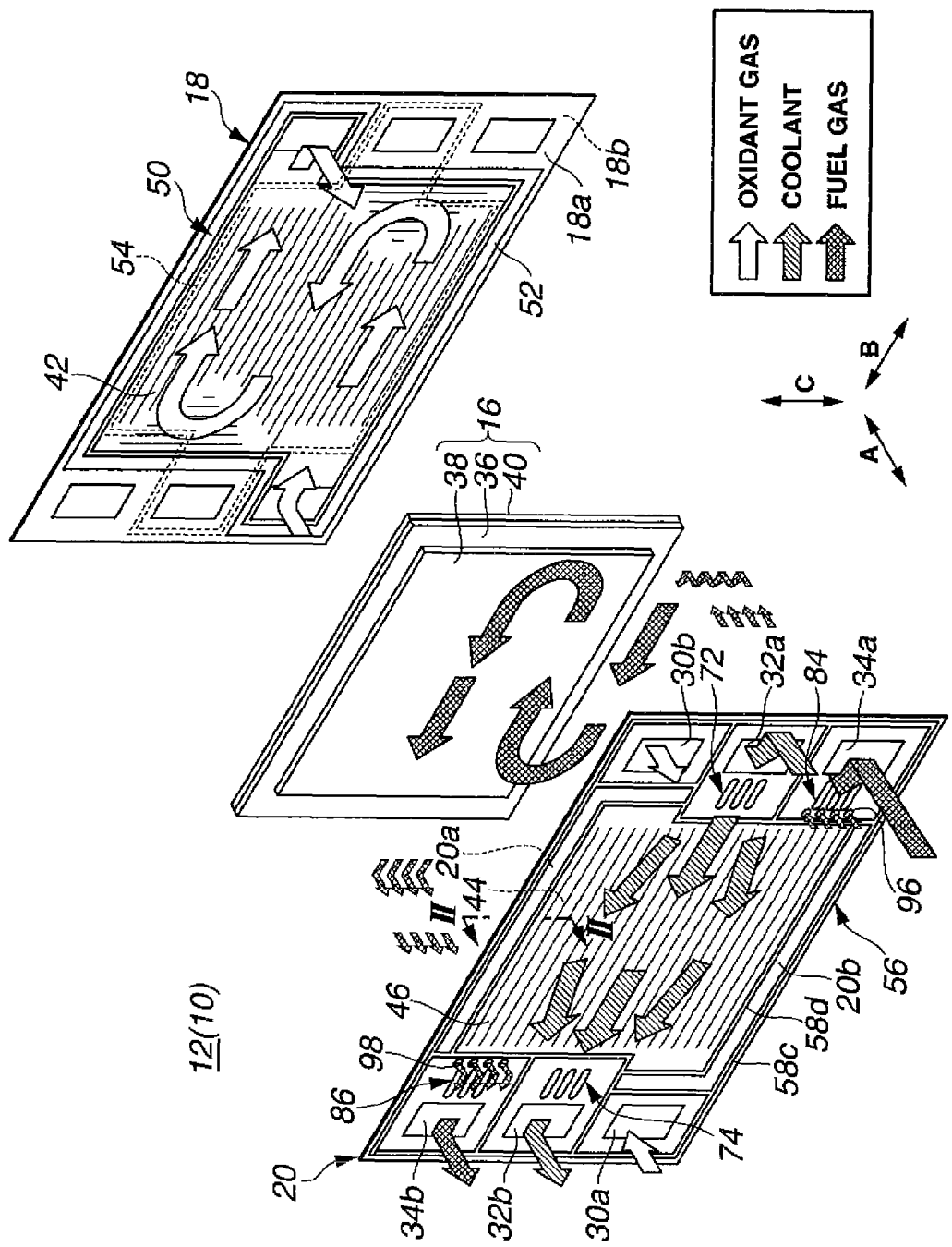
FIG. 1 is a perspective exploded view showing main components of a power-generating cell in a fuel cell stack according to one embodiment of the invention.

As used herein, the singular forms "a," "an" and "the" do not denote a limitation of quantity, but rather denote the presence of at least one of the referenced item. The terms "first," "second" and the like do not denote any order or importance, but rather are used to distinguish one element from another. It is also understood that terms such as "top," "bottom," "outward," "inward" and the like are words of convenience and are not to be construed as limiting terms.

The sealing material or sealing rubber composition of the invention is used to form a seal at the periphery on at least one surface of a separator for use in polymer electrolyte fuel cells (PEFCs). The sealing composition comprises as essential components, (A) 100 parts by weight of a liquid organopolysiloxane containing at least two alkenyl groups each attached to a silicon atom in a molecule, (B) 0.5 to 20 parts by weight of an organohydrogenpolysiloxane containing at least three hydrogen atoms each attached to a silicon atom in a molecule, (C) 10 to 30 parts by weight of fumed silica having a BET specific surface area of 50 to 400 m²/g, (D) 0.1 to 3 parts by weight of carbon powder, and (E) a catalytic amount of an addition reaction catalyst, the alkenyl-containing liquid organopolysiloxane (A) being a mixture of at least two liquid organopolysiloxanes having different weight average molecular weights.

Component A

Component (A) is a liquid organopolysiloxane containing at least two alkenyl groups each attached to a silicon atom in a molecule. Most often, it is represented by the following average compositional formula (I):

$$R^1_a SiO_{(4-a)/2} \qquad (I)$$

wherein $R^1$ which may be the same or different is a substituted or unsubstituted monovalent hydrocarbon group having 1 to 10 carbon atoms, preferably 1 to 8 carbon atoms, and "a" is a positive number in the range of 1.5 to 2.8, preferably 1.8 to 2.5.

Examples of the substituted or unsubstituted monovalent hydrocarbon group represented by $R^1$ include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl, as well as substituted forms of the foregoing groups in which some or all hydrogen atoms are replaced by halogen atoms (e.g., fluoro, bromo and chloro), cyano groups or the like, such as chloromethyl, chloropropyl, bromoethyl, trifluoropropyl and cyanoethyl. Preferably, at least 90 mol % of the entire $R^1$ are methyl.

At least two of $R^1$ should be alkenyl groups, preferably of 2 to 8 carbon atoms, more preferably 2 to 6 carbon atoms, and most preferably vinyl. The content of alkenyl groups is preferably $5.0 \times 10^{-6}$ mol/g to $5.0 \times 10^{-3}$ mol/g, more preferably $1.0 \times 10^{-5}$ mol/g to $1.0 \times 10^{-3}$ mol/g of the organopolysiloxane. An alkenyl content of less than $5.0 \times 10^{-6}$ mol/g may give too low a rubber strength to provide a satisfactory seal whereas an alkenyl content of more than $5.0 \times 10^{-3}$ mol/g may result in a higher crosslinked density and hence, brittle rubber.

The alkenyl groups may be attached to a silicon atom at the end of the molecular chain or a silicon atom midway the molecular chain or both. The inclusion of at least alkenyl groups attached to silicon atoms at both ends of the molecular chain is preferred.

The preferred organopolysiloxane basically has a linear structure, but may partially have a branched or cyclic structure.

In the invention, the alkenyl-containing liquid organopolysiloxane as component (A) should be a mixture of at least two liquid organopolysiloxanes having different weight average molecular weights. The at least two liquid organopolysiloxanes having different weight average molecular weights includes a first liquid organopolysiloxane (A-1) which is present in the greatest amount and a second liquid organopolysiloxane (A-2) which is present in the second greatest amount. The first and second liquid organopolysiloxanes have a weight average molecular weight Mw(A-1) and Mw(A-2), respectively. In one preferred embodiment, the weight average molecular weights Mw(A-1) and Mw(A-2) of the first and second liquid organopolysiloxanes fall in the range: $2 \leq Mw(A-2)/Mw(A-1) \leq 10$, and more preferably 2.5≦Mw(A-2)/Mw(A-1)≦6. If Mw(A-2)/Mw(A-1)<2, then a decline of strength may occur. If Mw(A-2)/Mw(A-1)>10, then Mw(A-1) may be too low to provide strength or Mw(A-2) may be too high, leading to too high a viscosity and difficulty of molding.

In another preferred embodiment, the first liquid organopolysiloxane has a weight average molecular weight Mw(A-1) of 10,000 to less than 30,000 and the second liquid organopolysiloxane has a weight average molecular weight Mw(A-2) of 30,000 to 100,000, that is, 10,000≦Mw(A-1)<30,000 and 30,000≦Mw(A-2)≦100,000. More preferably their molecular weights are in the range: 15,000≦Mw(A-1)<30,000 and 40,000≦Mw(A-2)≦80,000. It is noted that the weight average molecular weight is as determined by gel permeation chromatography (GPC) versus polystyrene standards.

In a further preferred embodiment, the amount A of the first liquid organopolysiloxane with Mw(A-1) and the amount B of the second liquid organopolysiloxane with Mw(A-2) are such that the weight ratio of A/B is from 10/9 to 10/1, and more preferably from 10/8 to 10/3. Outside the range, too low a weight ratio A/B may lead to a decline of rubber strength whereas too high a ratio A/B may lead to aggravated compression set and poor adhesion.

Component (A) may further include one or more additional organopolysiloxanes having a weight average molecular weight different from Mw(A-1) and Mw(A-2). It is preferred that the overall liquid organopolysiloxane as component (A) have a weight average molecular weight of 10,000 to 100,000, and more preferably 20,000 to 50,000. The content of additional organopolysiloxane(s) is preferably up to 30% by weight, and more preferably up to 20% by weight based on the total weight of component (A).

In this case, it is preferred that component (A) does not include an organopolysiloxane raw rubber having a weight average molecular weight of not less than 150,000 as the additional organopolysiloxane different from Mw(A-1) and Mw(A-2).

Component B

Component (B) is an organohydrogenpolysiloxane containing at least three hydrogen atoms each attached to a silicon atom (i.e., Si—H groups) in a molecule. It serves as a crosslinking agent for curing the composition wherein Si—H groups in the molecule crosslink with silicon-bonded alkenyl groups in component (A) through hydrosilylation addition reaction.

Most often, the organohydrogenpolysiloxane (B) is represented by the following average compositional formula (II):

$$R^2{}_b H_c SiO_{(4-b-c)/2} \quad (II)$$

wherein $R^2$ is each independently a substituted or unsubstituted monovalent hydrocarbon group having 1 to 10 carbon atoms, preferably 1 to 8 carbon atoms, "b" is a positive number of 0.7 to 2.1, "c" is a positive number of 0.001 to 1.0, and b+c is from 0.8 to 3.0. Preferred are those of formula (II) having at least three (typically 3 to 300), more preferably 3 to 100, most preferably 3 to 50 silicon-bonded hydrogen atoms in a molecule.

Examples of the monovalent hydrocarbon group represented by $R^2$ are as exemplified above for $R^1$ although groups free of aliphatic unsaturation (as in alkenyl groups) are preferred. Preferably, "b" is 0.8 to 2.0, "c" is 0.01 to 1.0, and b+c is from 1.0 to 2.5.

The molecular structure of the organohydrogenpolysiloxane may be straight, cyclic, branched or three-dimensional network. The number of silicon atoms per molecule or the degree of polymerization is preferably about 2 to about 300, especially about 4 to about 150. Differently stated, the preferred organohydrogenpolysiloxanes are those which are liquid at room temperature (25° C.) and specifically have a viscosity of up to 1,000 mPa-s, and more preferably 0.1 to 500 mPa-s at 25° C. as measured by a rotational viscometer.

Exemplary of the organohydrogenpolysiloxane (B) are trimethylsiloxy-endcapped methylhydrogenpolysiloxane, trimethylsiloxy-endcapped dimethylsiloxane-methylhydrogensiloxane copolymers, dimethylhydrogensiloxy-endcapped dimethylpolysiloxane, dimethylhydrogensiloxy-endcapped dimethylsiloxane-methylhydrogensiloxane copolymers, trimethylsiloxy-endcapped methylhydrogensiloxane-diphenylsiloxane copolymers, trimethylsiloxy-endcapped methylhydrogensiloxane-diphenylsiloxane-dimethylsiloxane copolymers, copolymers composed of $(CH_3)_2 HSiO_{1/2}$ units and $SiO_{4/2}$ units, and copolymers composed of $(CH_3)_2 HSiO_{1/2}$ units, $SiO_{4/2}$ units and $(C_6H_5)SiO_{3/2}$ units. As used herein, the term "endcapped" means that the polysiloxane is capped at both ends of its molecular chain with the indicated groups.

The amount of the organohydrogenpolysiloxane (B) blended is 0.5 to 20 parts, and preferably 0.6 to 15 parts by weight, per 100 parts by weight of component (A). The molar ratio of silicon-bonded hydrogen atoms (Si—H groups) in component (B) to alkenyl groups in component (A), [Si—H/alkenyl], is preferably from 0.8:1 to 5.0:1, especially from 1.0:1 to 3.0:1. A molar ratio outside this range may lead to cured rubber with increased compression set, aggravating the seal performance.

Component C

Component (C) is fumed silica which is essential to impart satisfactory strength to silicone rubber. The fumed silica should have a specific surface area of 50 to 400 m²/g, and preferably 100 to 350 m²/g, as measured by the BET method. A surface area below 50 m²/g may compromise acid resistance whereas above 400 m²/g, compression set increases. The fumed silica may be used as such, but preferably after treatment with a surface hydrophobizing agent. Alternatively, a surface treating agent is added when the fumed silica is mixed with the silicone fluid, whereby the fumed silica is treated during the mixing step. Suitable surface treating agents are well-known agents including alkylalkoxysilanes, alkylohlorosilanes, alkylsilazanes, silane coupling agents, titanate treating agents, and fatty acid esters alone or in admixture. When two or more agents are used, they may be applied at the same time or different times.

The amount of fumed silica (C) blended is 10 to 30 parts, especially 12 to 28 parts by weight, per 100 parts by weight of component (A). Less than 10 parts of the fumed silica fails to provide satisfactory rubber strength whereas more than 30 parts increases compression set, aggravating the seal performance.

Component D

Component (D) is carbon powder and essential for improving the adhesion to separator substrates. Carbon black is typical of the carbon powder. Examples of suitable carbon black include acetylene black, conductive furnace black (CF), super-conductive furnace black (SCF), extra-conductive furnace black (XCF), conductive channel black (CC), and furnace black and channel black which have been heat treated at high temperatures of the order of 1500° C.

Specific examples include acetylene blacks sold under the trade name of Denka Acetylene Black from Denki Kagaku Kogyo K.K. and Shawnigan Acetylene Black from Shawnigan Chemical Co.; conductive furnace blacks sold under the trade name of Continex CF from Continental Carbon and Vulcan C from Cabot Corp.; super-conductive furnace blacks sold under the trade name of Continex SCF from Continental Carbon and Vulcan SC from Cabot Corp.; extra-conductive furnace blacks sold under the trade name of Asahi HS-500 from Asahi Carbon Co., Ltd. and Vulcan XC-72 from Cabot Corp.; and conductive channel black sold under the trade name of Corax L from Degussa AG. Ketjen Black EC and Ketjen Black EC-600JD (Ketjen Black International) which belong to a class of furnace black are also useful.

Among others, acetylene black is most preferred. Carbon black may have a specific surface area of 30 to 120 $m^2/g$ and preferably 35 to 100 $m^2/g$ as measured by the BET method, an iodine adsorption value of 30 to 120 mg/g, and preferably 40 to 100 mg/g, and a DBP absorption value of 100 to 200 ml/100 g, and preferably 120 to 180 ml/100 g. Outside the ranges, carbon black may become ineffective in facilitating adhesion and give deleterious impacts to compression set and the like. It is noted that the iodine adsorption and DBP absorption values are measured according to JIS K1474 and JIS K6221, respectively.

The amount of carbon black blended is 0.1 to 3 parts, especially 0.3 to 2 parts by weight, per 100 parts by weight of component (A). Less than 0.1 part of carbon black fails to provide satisfactory adhesion whereas more than 3 parts has a deleterious impact on compression set and adversely affects insulation (i.e., allows the composition to be electrically conductive). Since the seal formed from the composition herein should be not only a seal against air, hydrogen gas and cooling media (e.g., LLC), but also an insulating seal, carbon black is preferably blended in such amounts that the cured rubber may have a resistivity (volume resistivity) equal to or more than 1.0 T$\Omega$-m.

Component E

Component (E) is an addition reaction catalyst for promoting addition reaction between alkenyl groups in the organopolysiloxanes as component (A) and silicon-bonded hydrogen atoms (Si—H groups) in the organohydrogenpolysiloxane as component (B). Most often, the catalyst is selected from platinum group metal-based catalysts including platinum catalysts such as platinum black, platinic chloride, chloroplatinic acid, reaction products of chloroplatinic acid with monohydric alcohols, complexes of chloroplatinic acid with olefins, and platinum bisacetoacetate as well as palladium catalysts and rhodium catalysts, with the platinum catalysts being preferred.

The amount of the catalyst blended is a catalytic amount to promote addition reaction and usually about 0.5 to 1,000 ppm, especially about 1 to 500 ppm of platinum group metal based on the weight of component (A). Less than 0.5 ppm may be ineffective to promote addition reaction, leading to undercure. Amounts of more than 1,000 ppm may exert little further effect on the addition reaction and be uneconomical.

Other Components

If necessary, the composition may further contain other components, for example, fillers such as precipitated silica, ground quartz, diatomaceous earth and calcium carbonate; hydrosilylation reaction regulating agents such as nitrogen-containing compounds, acetylene compounds, phosphorus compounds, nitrile compounds, carboxylates, tin compounds, mercury compounds, and sulfur compounds; heat resistance improvers such as iron oxide and cerium oxide; internal parting agents such as dimethylsilicone fluid; tackifiers, and thixotropic agents.

Separator Seal

The separator seal is formed of the sealing material or addition reaction cure type silicone rubber composition comprising the above-described components in the cured state. The silicone rubber composition may be applied and cured by well-known techniques, forming a seal on a PEFC separator.

More particularly, when PEFC separator seals are manufactured using the cured rubber, the silicone rubber composition is molded into a seal shape by a compression molding, casting or injection molding technique, and the molded seal is combined with a separator substrate. Alternatively, integrated seal-separator substrate members are manufactured by dipping, coating, screen printing, or insert molding. Preferred curing conditions for the silicone rubber composition include a temperature of 100 to 300° C. and a time of 10 seconds to 30 minutes.

The separator substrate used herein may be a metal thin plate or a substrate manufactured by integral molding of an electrically conductive powder in a binder. A seal is formed from the silicone rubber composition along the periphery of this separator substrate by the above-described technique, whereupon a PEFC separator within the scope of the invention is available.

Examples of the conductive powder include natural graphite such as flake graphite, artificial graphite, and conductive carbon blacks such as acetylene black and Ketjen Black. Any powders may be used as long as they are electrically conductive. Suitable binders include epoxy resins, phenolic resins, and rubber-modified phenolic resins.

According to the invention, the silicone rubber composition is applied and cured to the periphery of a separator substrate by a suitable technique such as compression molding, casting, injection molding, transfer molding, dipping, coating or screen printing. Thus the cured silicone rubber composition forms a seal. This results in a separator for PEFCs in which a ring-like seal (separator seal) is formed on the substrate so as to circumferentially extend along the periphery of the substrate.

Preferably the seal has a thickness or height of 0.1 to 2 mm. A seal of less than 0.1 mm may be difficult to form and exert less sealing effects whereas a seal of more than 2 mm may be inconvenient for size reduction.

Now referring to the figures, some embodiments of the separator for PEFCs according to the invention are illustrated. The invention is not limited thereto.

Figure 2:
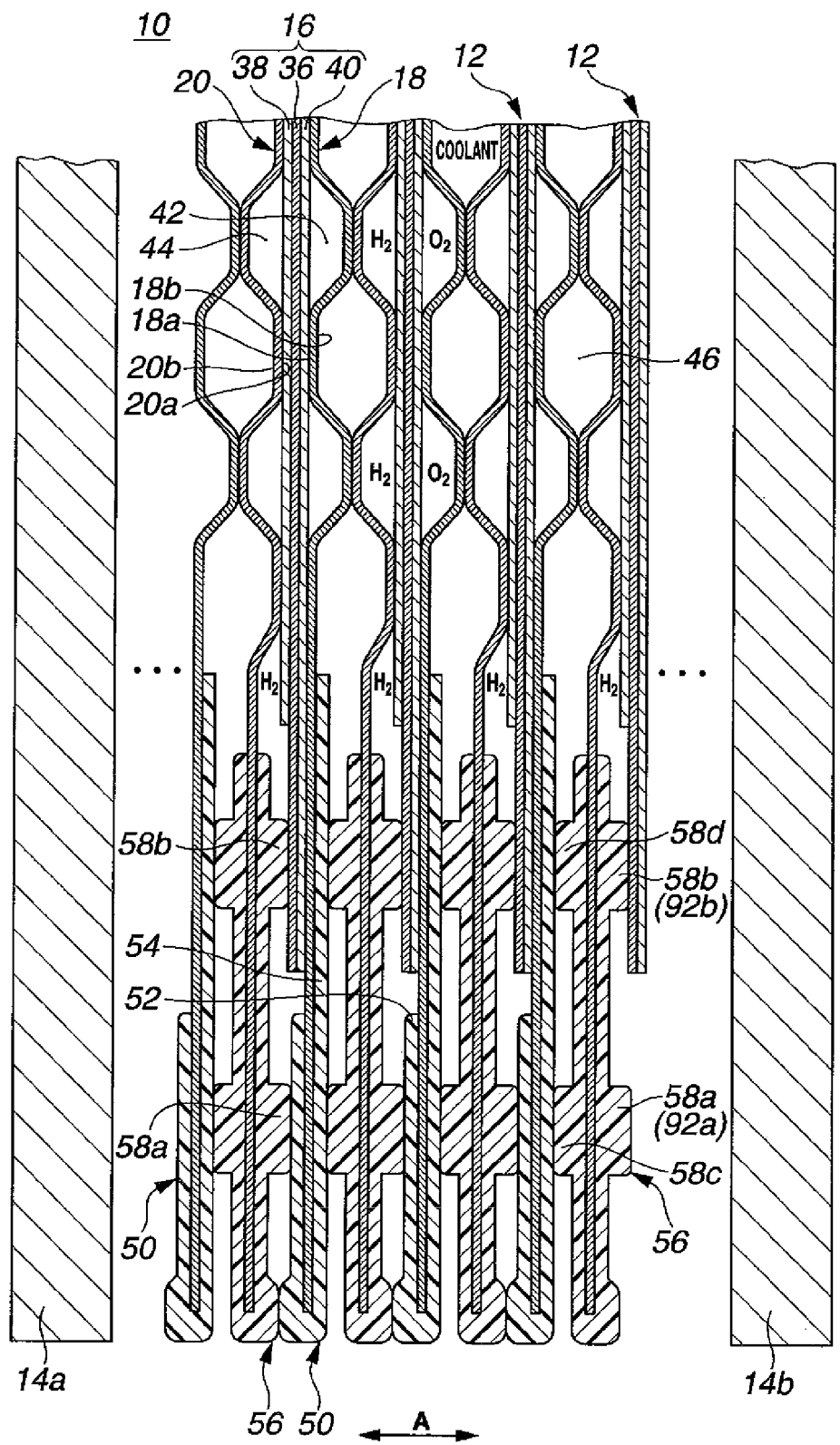
FIG. 2 is a cross-sectional view of the fuel cell stack taken along lines II-II in FIG. 1.

FIG. 1 is a perspective exploded view showing main components of a power-generating cell 12 constituting a fuel cell stack 10 according to one embodiment of the invention. A plurality of power-generating cells 12 are stacked in the direction of arrow A to construct the fuel cell stack 10. FIG. 2 is a cross-sectional view of this fuel cell stack 10 taken along lines II-II in FIG. 1.

Figure 3:
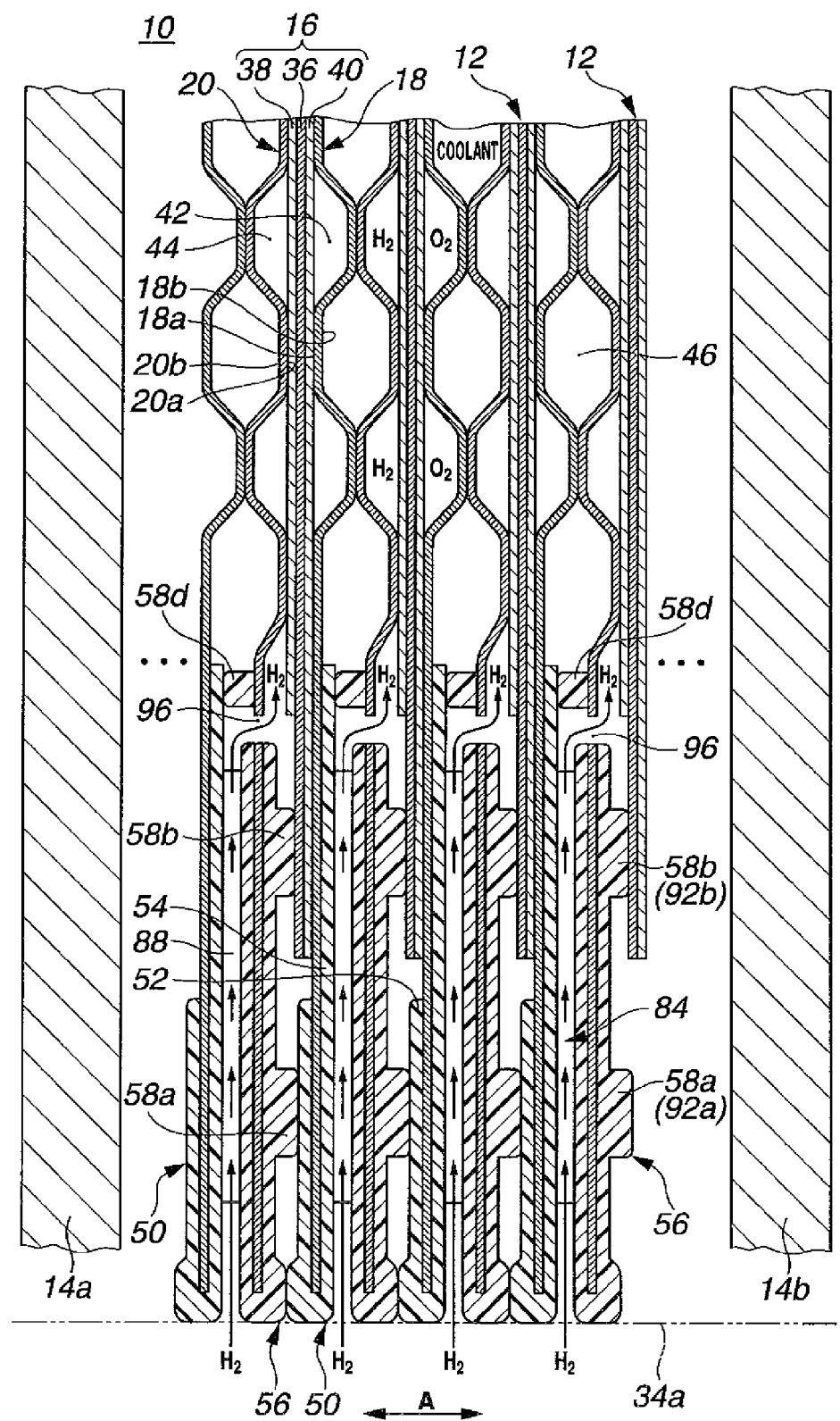
FIG. 3 is a cross-sectional view traversing a fuel gas inlet communication hole of the fuel cell stack.
Figure 4:
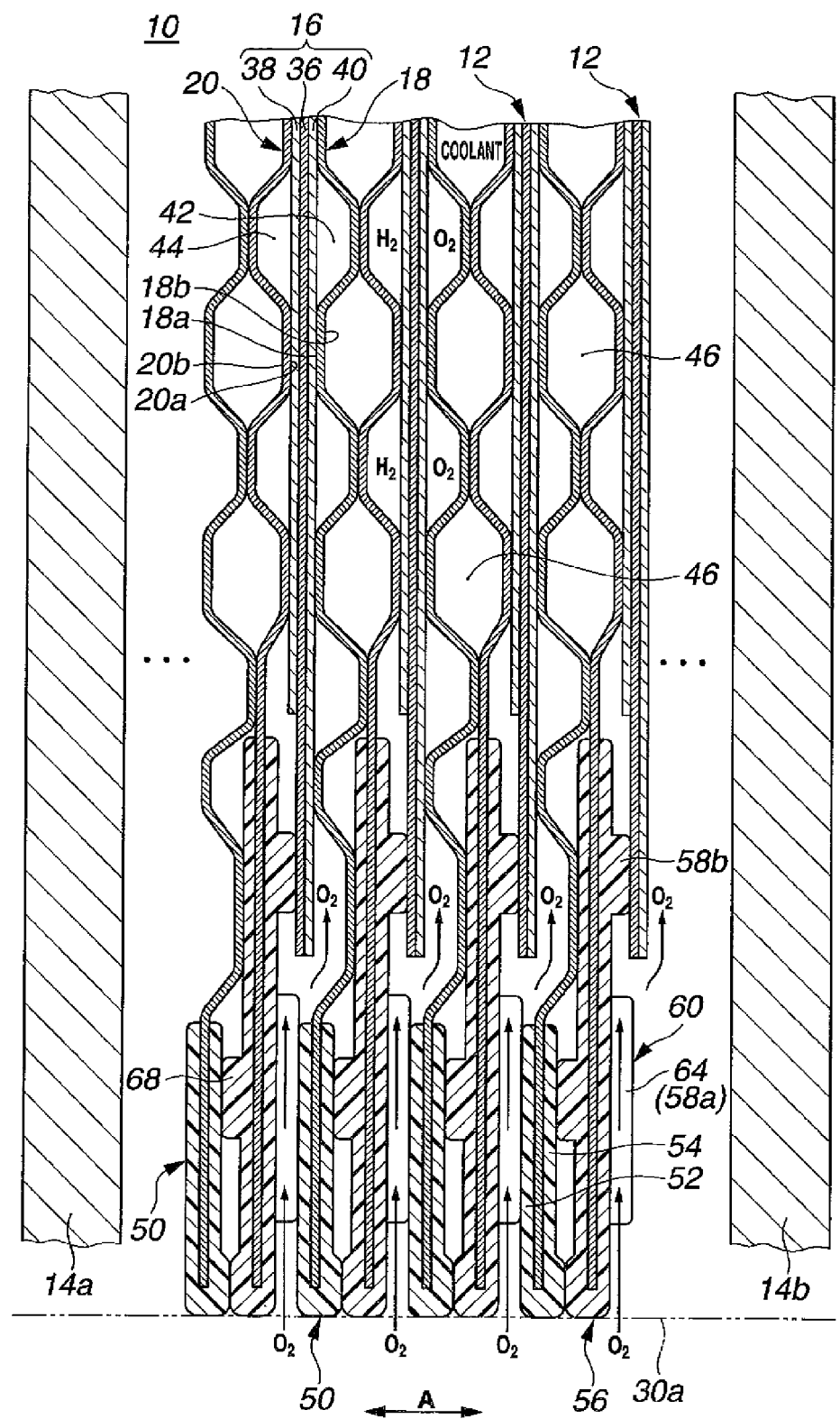
FIG. 4 is a cross-sectional view traversing an oxidant gas inlet communication hole of the fuel cell stack.

As shown in FIGS. 2 to 4, the fuel cell stack 10 includes a plurality of power-generating cells 12 stacked in the direction of arrow A and end plates 14a, 14b at opposite ends in the stacking direction. The end plates 14a, 14b are fixedly tied via tie rods (not shown) so that a fastening load is applied across the stacked cells 12 in the direction of arrow A.

As shown in FIG. 1, each power-generating cell 12 includes an electrolyte membrane-electrode assembly (MEA) 16 interposed between first and second metal separators 18 and 20. The first and second metal separators 18 and 20 are, for example, steel plates, stainless steel plates, aluminum plates, plated steel plates or such metal plates which have been surface treated to be corrosion resistant. Their thickness is set in the range of 0.05 to 1.0 mm, for example.

At one side edge of the power-generating cell 12 in the direction of arrow B (in FIG. 1, typically horizontal direction), an oxidant gas inlet communication hole 30a for feeding an oxidant gas such as oxygen-containing gas, a coolant outlet communication hole 32b for discharging a coolant medium, and a fuel gas outlet communication hole 34b for discharging a fuel gas such as hydrogen-containing gas, which are in fluid communication with corresponding holes in adjacent cells in the direction of arrow A or stacking direction, are arranged in the direction of arrow C (typically vertical direction).

At the other side edge of the power-generating cell 12 in the direction of arrow B, a fuel gas inlet communication hole 34a for feeding the fuel gas, a coolant inlet communication hole 32a for feeding the coolant medium, and an oxidant gas outlet communication hole 30b for discharging the oxidant gas, which are in fluid communication with corresponding holes in adjacent cells in the direction of arrow A, are arranged in the direction of arrow C.

Specifically, the MEA 16 includes a solid polymer electrolyte membrane 36 in the form of a perfluorocarbon sulfonic acid thin film impregnated with water, which is sandwiched between an anode (or first electrode) 38 and a cathode (or second electrode) 40. The anode 38 has a smaller surface area than the cathode 40.

The anode 38 and cathode 40 each include a gas diffusion layer formed of carbon paper or the like, and an electrocatalytic layer which is formed by uniformly applying porous carbon particles having a platinum alloy supported on their surfaces to the surface of the gas diffusion layer. The electrocatalytic layers are joined to the opposite surfaces of the solid polymer electrolyte membrane 36.

Figure 5:
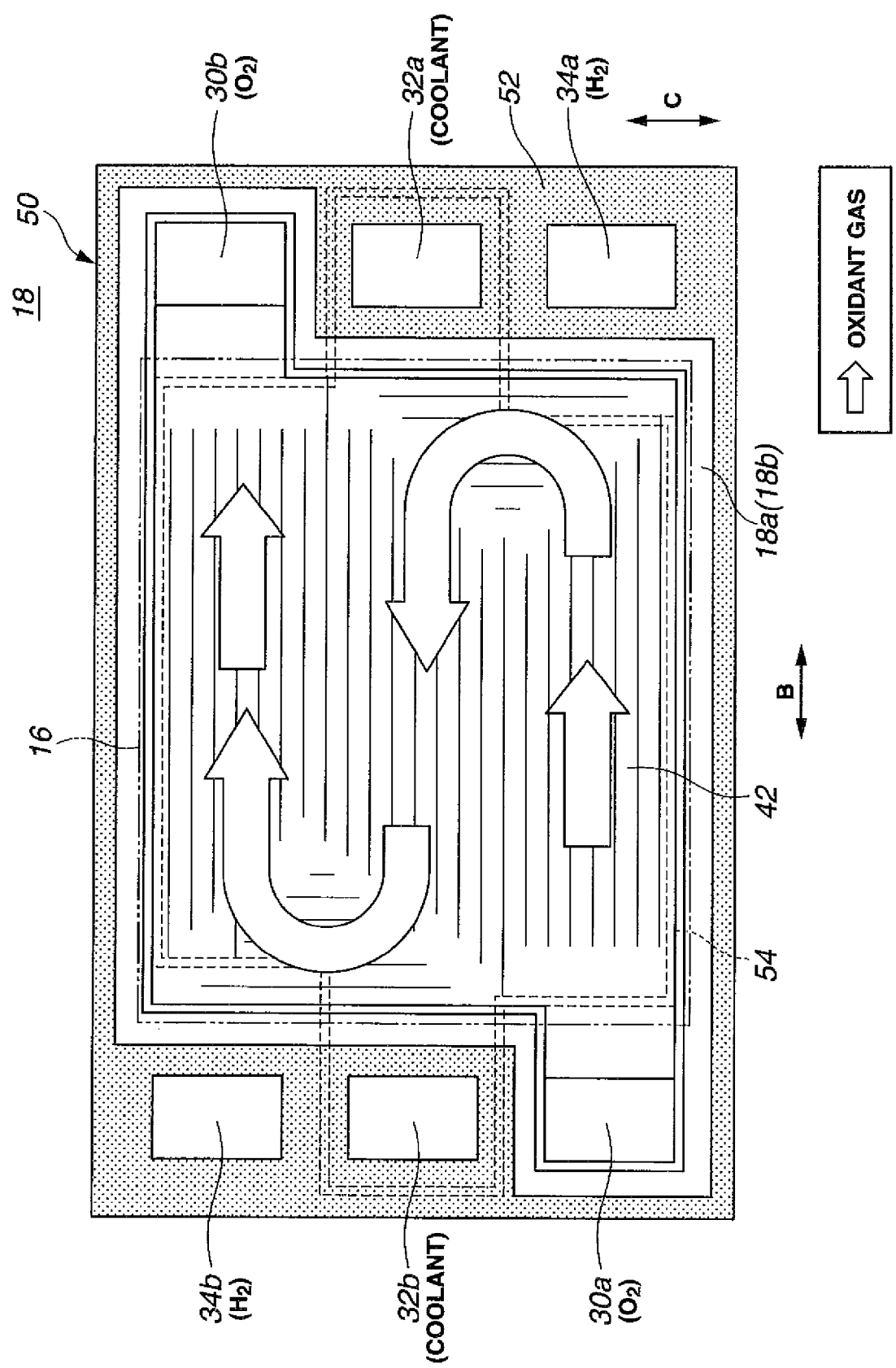
FIG. 5 is a front view of a first metal separator constituting the power-generating cell.
Figure 6:
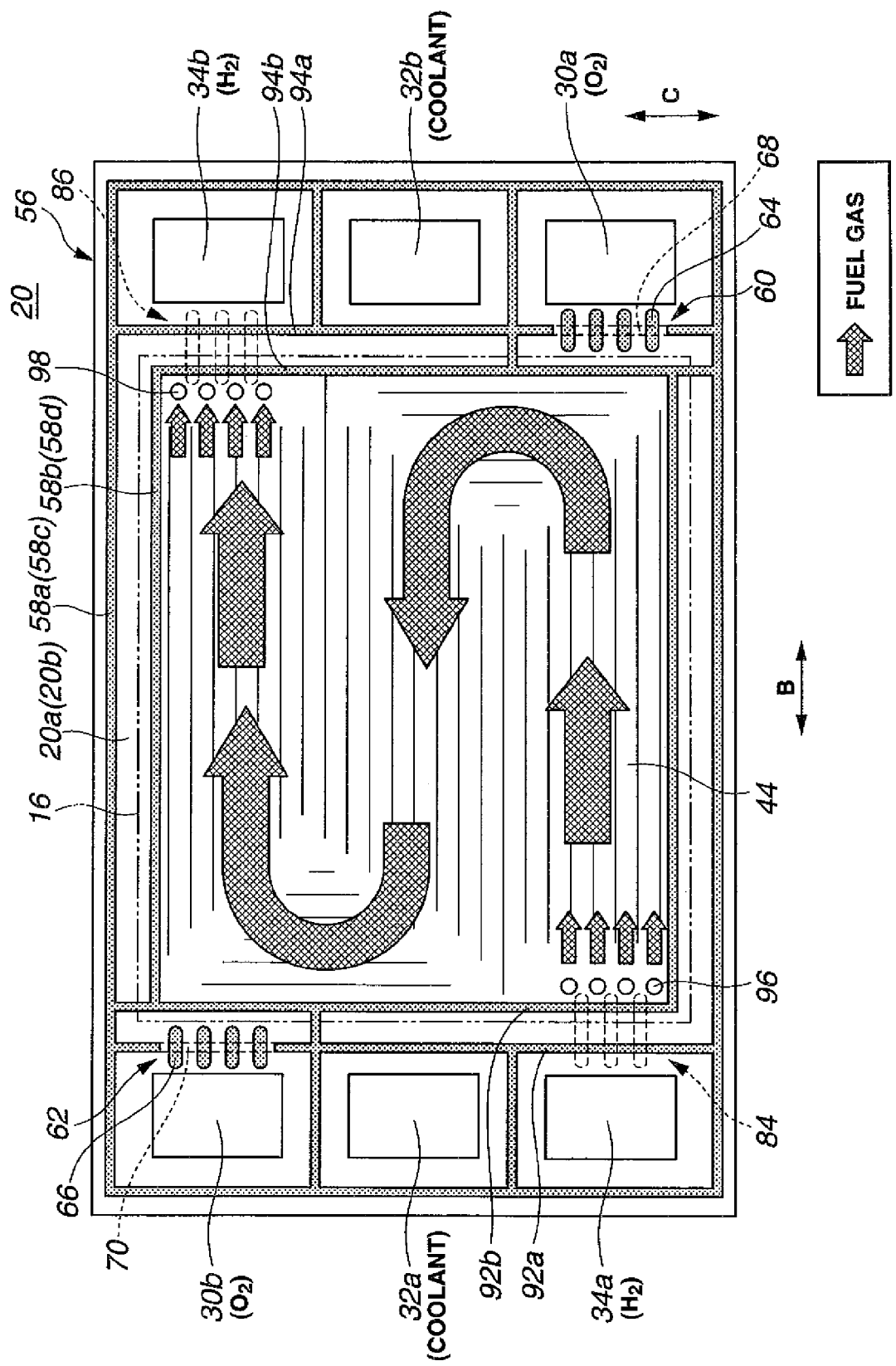
FIG. 6 is a front view showing one surface of a second metal separator constituting the power-generating cell.

The first and second metal separators 18 and 20 have inner surfaces 18a and 20a facing MEA 16 and outer surfaces 18b and 20b, respectively. The inner surface 18a of first metal separator 18 is provided with oxidant gas flow channels (reaction gas flow channels) 42 which extend in a serpentine manner in the direction of arrow B and vertically upward (see FIGS. 1 and 5). As shown in FIG. 6, the inner surface 20a of second metal separator 20 is provided with fuel gas flow channels (reaction gas flow channels) 44 which are in fluid communication with fuel gas inlet communication hole 34a and fuel gas outlet communication hole 34b as will be described later, and extend in a serpentine manner in the direction of arrow B and vertically upward (in the direction of arrow C).

As shown in FIGS. 1 and 2, coolant flow channels 46 are defined between the surfaces 18b and 20b of first and second metal separators 18 and 20 and in fluid communication with coolant inlet and outlet communication holes 32a and 32b. The coolant flow channels 46 extend straight in the direction of arrow B.

As shown in FIGS. 1 to 5, a first seal member 50 extends circumferentially along the peripheral edge of first metal separator 18 and is integrally joined to the surfaces 18a and 18b of first metal separator 18. The first seal member 50 is formed by applying the rubber composition to the separator substrate by a technique such as compression molding, casting, injection molding, transfer molding, dipping, coating or screen printing, and curing.

The first seal member 50 includes a first planar portion 52 which is integrally joined to the surface 18a of first metal separator 18 and a second planar portion 54 which is integrally joined to the surface 18b of first metal separator 18. The second planar portion 54 extends longer than the first planar portion 52.

As shown in FIGS. 2 and 3, the first planar portion 52 extends circumferentially at a position outward spaced apart from the peripheral edge of MEA 16, and the second planar portion 54 extends circumferentially over a region overlying a certain portion of cathode 40. As shown in FIG. 5, the first planar portion 52 is formed such that oxidant gas inlet and outlet communication holes 30a and 30b are in fluid communication with oxidant gas flow channels 42, and the second planar portion 54 is formed such that coolant inlet communication hole 32a is in fluid communication with coolant outlet communication hole 32b.

A second seal member 56 extends circumferentially along the peripheral edge of second metal separator 20 and is integrally joined to the surfaces 20a and 20b of second metal separator 20. On the surface 20a side of second metal separator 20, the second seal member 56 is provided with an outside seal 58a which is disposed on surface 20a in proximity to the peripheral edge of second metal separator 20, and an inside seal 58b which is inwardly spaced apart from the outside seal 58a. The outside and inside seals 58a and 58b are provided on one side of second seal member 56 facing the anode 38.

The outside and inside seals 58a and 58b may have any desired shape selected from a tapered (or lip), trapezoid and semicylindrical shape. The outside seal 58a is in contact with first planar portion 52 of first metal separator 18, and the inside seal 58b is in direct contact with solid polymer electrolyte membrane 36 of MEA 16.

As shown in FIG. 6, the outside seal 58a circumscribes oxidant gas inlet communication hole 30a, coolant outlet communication hole 32b, fuel gas outlet communication hole 34b, fuel gas inlet communication hole 34a, coolant inlet communication hole 32a and oxidant gas outlet communication hole 30b. The inside seal 58b circumscribes fuel gas flow channels 44. The peripheral edge of MEA 16 is disposed between outside and inside seals 58a and 58b.

Figure 7:
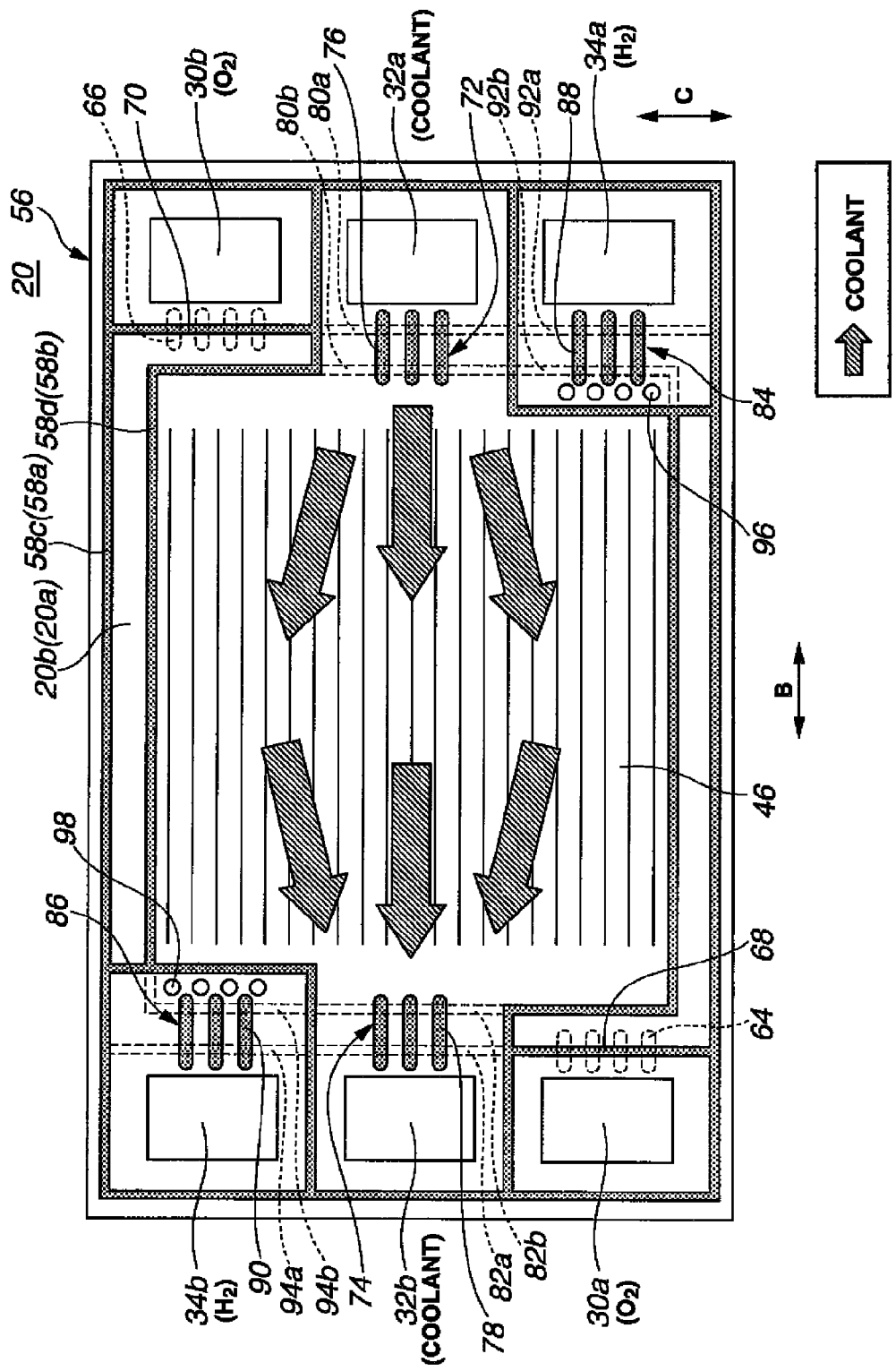
FIG. 7 is a front view showing the other surface of the second metal separator constituting the power-generating cell.

On the surface 20b side of second metal separator 20, the second seal member 56 is provided with an outside seal (coolant seal) 58c which corresponds to outside seal 58a, and an inside seal 58d which corresponds to inside seal 58b (see FIG. 7). The outside and inside seals 58c and 58d have the same shape as outside and inside seals 58a and 58b.

As shown in FIG. 6, the outside seal 58a is provided with an inlet manifold 60 which establishes fluid communication between oxidant gas inlet communication hole 30a and oxidant gas flow channels 42, and an outlet manifold 62 which establishes fluid communication between oxidant gas outlet communication hole 30b and oxidant gas flow channels 42.

The inlet manifold 60 is constructed by a plurality of supports 64 which are formed by cutting off outside seal 58a at positions spaced apart in the direction of arrow C and extend in the direction of arrow B. Communication paths for oxidant gas are defined between supports 64. The outlet manifold 62 is similarly constructed by a plurality of supports 66 which are formed by partially cutting off outside seal 58a and extend in the direction of arrow B. The supports 66 are in contact with first planar portion 52 to define communication paths for oxidant gas therebetween.

The supports 64 of inlet manifold 60 overlie seal laps 68 of outside seal 58c while being on the opposite surfaces 20a, 20b of second metal separator 20. Notably, the seal laps 68 are portions of outside seal 58c that overlie supports 64 of outside seal 58a, with second metal separator 20 interposed therebetween.

The outlet manifold 62 is constructed as is the inlet manifold 60. The supports 64 and seal laps 70 of outside seal 58c that overlie each other on the opposite surfaces 20a, 20b of second metal separator 20 are set such that the deformation of seals in the stacking direction under the load applied in the stacking direction is substantially equalized (see FIG. 6).

As shown in FIG. 7, the surface 20b of second metal separator 20 is provided with an inlet manifold 72 which establishes fluid communication between coolant inlet communication hole 32a and coolant flow channels 46, and an outlet manifold 74 which establishes fluid communication between coolant outlet communication hole 32b and coolant flow channels 46. The inlet manifold 72 is constructed by a plurality of supports 76 which are spaced apart in the direction of arrow C, extend in the direction of arrow B, and constitute outside and inside seals 58c and 58d. The outlet manifold 74 is similarly constructed by a plurality of supports 78 which are spaced apart in the direction of arrow C, extend in the direction of arrow B, and constitute outside and inside seals 58c and 58d.

The inlet manifold 72 overlies seal laps 80a and 80b constituting outside and inside seals 58a and 58b on surface 20a, with second metal separator 20 interposed therebetween.

Similarly, supports 78 constituting outlet manifold 74 overlie seal laps 82a and 82b of outside and inside seals 58a and 58b, while being on opposite surfaces 20a and 20b of second metal separator 20, as shown in FIG. 7.

As shown in FIG. 7, on the surface 20b of second metal separator 20, an inlet manifold 84 and an outlet manifold 86 are provided in proximity to fuel gas inlet communication hole 34a and fuel gas outlet communication hole 34b, respectively. The inlet manifold 84 is provided with a plurality of supports 88 arranged in the direction of arrow C, and the outlet manifold 86 is similarly provided with a plurality of supports 90 arranged in the direction of arrow C.

The supports 88 of inlet manifold 84 overlie seal laps 92a and 92b of outside and inside seals 58a and 58b, with second metal separator 20 interposed therebetween. Similarly, the supports 90 of outlet manifold 86 overlie seal laps 94a and 94b of outside and inside seals 58a and 58b, with second metal separator 20 interposed therebetween.

The inlet manifold 84 and seal laps 92a, 92b, and the outlet manifold 86 and seal laps 94a, 94b are set such that the deformation of seals in the stacking direction under the load applied in the stacking direction is substantially equalized. Specifically, the inlet manifold 84 is constructed as is the inlet manifold 72. A plurality of feed holes 96 and discharge holes 98 are formed in proximity to inlet and outlet manifolds 84 and 86 and disposed outward of inside seal 58d. The feed holes 96 and discharge holes 98 are formed throughout the separator inward of inside seal 58b on the surface 20a side of second metal separator 20 and at the inlet and outlet sides of fuel gas flow channels 44 (see FIG. 6).

Although outside seal 58c is formed as a coolant seal on the surface 20b of second metal separator 20 in the illustrated embodiment, the invention is not limited thereto. Such a coolant seal may be formed on the surface 18b of first metal separator 18.

EXAMPLE

Examples and Comparative Examples are given below for further illustrating the invention, but the invention is not limited thereto. All parts are by weight. Mw is weight average molecular weight.

Example 1

30 parts of liquid dimethylpolysiloxane #1 capped with dimethylvinylsiloxy at both ends and having a Mw of 18,000 and a vinyl content of 0.00012 mol/g and 35 parts of liquid dimethylpolysiloxane #2 capped with trimethylsiloxy at both ends, containing vinyl on side chains, and having a Mw of 45,000 and a vinyl content of 0.00008 mol/g were mixed with 35 parts of fumed silica having a BET specific surface area of 200 m$^2$/g (Aerosil 200, Nippon Aerosil Co., Ltd.), 6 parts of hexamethyldisilazane, and 2.0 parts of water at room temperature for 30 minutes. The mixture was heated at 150° C., agitated at the temperature for 3 hours, and cooled. To this mixture, 2 parts of carbon powder A (Denka Black HS-100, Denki Kagaku Kogyo K.K., BET specific surface area=39 m$^2$/g, iodine adsorption value 52 mg/g, DBP absorption value 140 ml/100 g) was added. The mixture was worked once on a three-roll mill, yielding a silicone rubber base. This silicone rubber base, 100 parts, was combined with 50 parts of dimethylvinylsiloxy-endcapped dimethylpolysiloxane #1 and milled for 30 minutes. To the mixture were added 2.9 parts (giving [Si—H/vinyl]=1.5 in molar ratio) of methylhydrogenpolysiloxane #3 capped with trimethylsiloxy at both ends, containing Si—H groups on side chains, and having a degree of polymerization of 38 and a Si—H content of 0.0065 mol/g as a crosslinking agent and 0.05 part of ethynyl cyclohexanol as a reaction regulator. Continued milling for 15 minutes gave a mixture.

A silicone rubber composition was prepared by combining 100 parts of the mixture with 0.1 part of a platinum catalyst (Pt concentration 1 wt %), press cured at 120° C. for 10 minutes, and post cured in an oven at 200° C. for 4 hours. The cured sample was measured for hardness, tensile strength, elongation at break, tear strength, and compression set according to JIS K6249, with the results shown in Table 1.

There were furnished 60 wt % carbon-filled epoxy resin and stainless steel (SUS) plates having a primer coated thereon (Primer No. 101A/B, Shin-Etsu Chemical Co., Ltd., air drying+150° C.×30 min baking). The silicone rubber composition was press cured to the epoxy resin and stainless steel plates at 150° C. for 5 minutes to form a rubber layer of 0.5 mm thick, and post cured at 200° C. for 4 hours. The samples were immersed in 0.01N sulfuric acid solution at 120° C. for 500 hours. After removal, the samples were examined by a bond strength test where a percent cohesive failure was computed by peeling the rubber layer. The results are shown in Table 2.

A molding test was performed by insert molding the silicone rubber composition on a stainless steel plate to form a seal having the structure shown in FIG. 5, with the results shown in Table 3.

Example 2

80 parts of liquid dimethylpolysiloxane #4 capped with dimethylvinylsiloxy at both ends and having a Mw of 26,000 and a vinyl content of 0.000088 mol/g was mixed with 30 parts of fumed silica surface treated to be hydrophobic and having a specific surface area of 260 m$^2$/g (Rheorosil DM30S, Tokuyama Co., Ltd.), 5 parts of hexamethyldisilazane, and 1.0 part of water at room temperature for 30 minutes. The mixture was heated at 150° C., agitated at the temperature for 3 hours, and cooled. This mixture was then blended with 50 parts of liquid dimethylpolysiloxane #2 (in Example 1), 10 parts of liquid dimethylpolysiloxane #5 capped with trimethylsiloxy at both ends, containing vinyl on side chains and having a Mw of 8,000 and a vinyl content of 0.0012 mol/g, and 1 part of carbon powder B (Denka Black 100% Press, Denki Kagaku Kogyo K.K., specific surface area=65 m$^2$/g, iodine adsorption value 88 mg/g, DBP absorption value 160 ml/100 g). The mixture was worked once on a three-roll mill, yielding a silicone rubber base. To 170 parts of the silicone rubber base were added 7.1 parts (giving [Si—H/vinyl]=2.0 in molar ratio) of methylhydrogenpolysiloxane #3 (in Example 1, degree of polymerization 38, Si—H content 0.0065 mol/g) as a crosslinking agent and 0.05 part of ethynyl cyclohexanol as a reaction regulator. Continued milling for 15 minutes gave a mixture.

A silicone rubber composition was prepared by combining 100 parts of the mixture with 0.1 part of a platinum catalyst (Pt concentration 1 wt %). As in Example 1, it was examined for hardness, tensile strength, elongation at break, tear strength, compression set, and adhesion, with the results shown in Tables 1 and 2.

A molding test was performed by insert molding the silicone rubber composition on a stainless steel plate to form a seal having the structure shown in FIG. 5, with the results shown in Table 3.

Comparative Example 1

30 parts of liquid dimethylpolysiloxane #1 capped with dimethylvinylsiloxy at both ends and having a Mw of 18,000 and a vinyl content of 0.00012 mol/g and 35 parts of liquid dimethylpolysiloxane #2 capped with trimethylsiloxy at both ends, containing vinyl on side chains, and having a Mw of 45,000 and a vinyl content of 0.00009 mol/g were mixed with 35 parts of fumed silica having a BET specific surface area of 200 m$^2$/g (Aerosil 200, Nippon Aerosil Co., Ltd.), 6 parts of hexamethyldisilazane, and 2.0 parts of water at room temperature for 30 minutes. The mixture was heated at 150° C., agitated at the temperature for 3 hours, and cooled. The resulting silicone rubber base, 100 parts, was combined with 50 parts of dimethylvinylsiloxy-endcapped dimethylpolysiloxane #1 and milled for 30 minutes. To the mixture were added 2.9 parts (giving [Si—H/vinyl]=1.5 in molar ratio) of methylhydrogenpolysiloxane #3 capped with trimethylsiloxy at both ends, containing Si—H groups on side chains, and having a degree of polymerization of 38 and a Si—H content of 0.0065 mol/g as a crosslinking agent and 0.05 part of ethynyl cyclohexanol as a reaction regulator. Continued milling for 15 minutes gave a mixture.

A silicone rubber composition was prepared by combining 100 parts of the mixture with 0.1 part of a platinum catalyst (Pt concentration 1 wt %). As in Example 1, it was examined for hardness, tensile strength, elongation at break, tear strength, compression set, and adhesion, with the results shown in Tables 1 and 2.

A molding test was performed by insert molding the silicone rubber composition on a stainless steel plate to form a seal having the structure shown in FIG. 5, with the results shown in Table 3.

Comparative Example 2

80 parts of liquid dimethylpolysiloxane #4 capped with dimethylvinylsiloxy at both ends and having a Mw of 26,000 and a vinyl content of 0.000088 mol/g was mixed with 30 parts of fumed silica surface treated to be hydrophobic and having a specific surface area of 260 m$^2$/g (Rheorosil DM30S, Tokuyama Co., Ltd.), 5 parts of hexamethyldisilazane, and 1.0 part of water at room temperature for 30 minutes. The mixture was heated at 150° C., agitated at the temperature for 3 hours, and cooled. This mixture was then blended with 60 parts of dimethylpolysiloxane #4 and 1 part of carbon powder B (Denka Black 100% Press, Denki Kagaku Kogyo K.K., BET specific surface area=65 m$^2$/g, iodine adsorption value 88 mg/g, DBP absorption value 160 ml/100 g). The mixture was worked once on a three-roll mill, yielding a silicone rubber base. To 170 parts of the silicone rubber base were added 3.8 parts (giving [Si—H/vinyl]=2.0 in molar ratio) of methylhydrogenpolysiloxane #3 (in Example 1, degree of polymerization 38, Si—H content 0.0065 mol/g) as a crosslinking agent and 0.05 part of ethynyl cyclohexanol as a reaction regulator. Continued milling for 15 minutes gave a mixture.

A silicone rubber composition was prepared by combining 100 parts of the mixture with 0.1 part of a platinum catalyst (Pt concentration 1 wt %). As in Example 1, it was examined for hardness, tensile strength, elongation at break, tear strength, compression set, and adhesion, with the results shown in Tables 1 and 2.

A molding test was performed by insert molding the silicone rubber composition on a stainless steel plate to form a seal having the structure shown in FIG. 5, with the results shown in Table 3.

TABLE 1

|  | Example | | Comparative Example | |
|---|---|---|---|---|
|  | 1 | 2 | 1 | 2 |
| Hardness, Durometer A | 44 | 54 | 43 | 39 |
| Tensile strength, MPa | 6.9 | 5.5 | 6.7 | 3.8 |
| Elongation at break, % | 420 | 310 | 430 | 520 |
| Tear strength (angle), kN/mm | 28 | 22 | 26 | 12 |
| Compression set in air, % | 7.6 | 6.9 | 9.1 | 7.5 |
| Compression set in 0.01N H$_2$SO$_4$, % | 13.9 | 14.1 | 16.8 | 15.9 |

TABLE 2

|  | Cohesive failure | | | |
|---|---|---|---|---|
|  | Example | | Comparative Example | |
| Substrate | 1 | 2 | 1 | 2 |
| Stainless steel | 98% | 95% | 60% | 100% |
| Carbon-filled epoxy resin | 100% | 100% | 35% | 100% |

Below described is the molding test for inspecting whether an integral seal-separator having the structure shown in FIG. 5 is moldable from the silicone rubber composition. A stainless steel substrate having a primer coated thereon (Primer No. 101A/B, Shin-Etsu Chemical Co., Ltd., air drying+150° C.×30 min baking) was furnished as a separator. By insert molding, the silicone rubber composition was molded and cured around the substrate in a mold at a temperature of 150° C. for 5 minutes. The rubber sample was removed from the mold. The sample was regarded defective when the rubber was broken even partially upon removal from the mold. A percentage of defective samples is reported in Table 3. The sample was post cured at 200° C. for 4 hours and examined by a bond strength test where a percent cohesive failure was computed by peeling the rubber layer. Provided that samples having a cohesive failure of 100% pass the test, a percentage of defective samples is shown in Table 3.

TABLE 3

|  | Molding tests | | | |
|---|---|---|---|---|
|  | Example | | Comparative Example | |
|  | 1 | 2 | 1 | 2 |
| Rubber breakage upon mold removal | 0% | 0% | 0% | 65% |
| Defective bond | 0% | 0% | 55% | 0% |

Japanese Patent Application No. 2007-317448 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A separator seal for use in polymer electrolyte fuel cells which is formed of a sealing composition in the cured state, said sealing composition comprising:
    (A) 100 parts by weight of a liquid organopolysiloxane containing at least two alkenyl groups each attached to a silicon atom in a molecule,
    (B) 0.5 to 20 parts by weight of an organohydrogenpolysiloxane containing at least three hydrogen atoms each attached to a silicon atom in a molecule,
    (C) 10 to 30 parts by weight of fumed silica having a BET specific surface area of 50 to 400 m$^2$/g,
    (D) 0.1 to 3 parts by weight of carbon black having a BET specific surface area of 30 to 120 m$^2$/g, an iodine adsorption value of 30 to 120 mg/g, and a DBP absorption value of 100 to 200 ml/100 g, and
    (E) a catalytic amount of an addition reaction catalyst,
    said alkenyl-containing liquid organopolysiloxane (A) being a mixture of at least two liquid organopolysiloxanes having different weight average molecular weights.

2. The separator seal of claim 1 wherein in the liquid organopolysiloxane (A), at least 90 mol % of the entire organic groups attached to silicon atoms are methyl.

3. The separator seal of claim 1 wherein a molar ratio of Si—H groups in component (B) to alkenyl groups in component (A) is between 0.8:1 and 5.0:1.

4. The separator seal of claim 1 wherein the at least two liquid organopolysiloxanes having different weight average molecular weights includes a first liquid organopolysiloxane (A-1) which is present in the greatest amount and a second liquid organopolysiloxane (A-2) which is present in the second greatest amount, the first and second liquid organopolysiloxanes have a weight average molecular weight Mw(A-1) and Mw(A-2), respectively, which falls in the range: $2 \leq Mw(A-2)/Mw(A-1) \leq 10$.

5. The separator seal of claim 1 wherein the at least two liquid organopolysiloxanes having different weight average molecular weights includes a first liquid organopolysiloxane (A-1) which is present in the greatest amount and a second liquid organopolysiloxane (A-2) which is present in the second greatest amount, the first liquid organopolysiloxane has a weight average molecular weight Mw(A-1) of 10,000 to less than 30,000 and the second liquid organopolysiloxane has a weight average molecular weight Mw(A-2) of 30,000 to 100,000.

6. The separator seal of claim 1 having a volume resistivity of at least 1.0 TΩ-m.

7. A separator for use in polymer electrolyte fuel cells comprising a substrate comprising a metal thin plate or a conductive powder and a binder and a seal formed at a periphery on at least one surface of the substrate, said seal comprising the separator seal of claim 1.

8. A separator seal for use in polymer electrolyte fuel cells which is formed of a sealing composition in the cured state, said sealing composition consisting of:
    (A) 100 parts by weight of a liquid organopolysiloxane containing at least two alkenyl groups each attached to a silicon atom in a molecule,
    (B) 0.5 to 20 parts by weight of an organohydrogenpolysiloxane containing at least three hydrogen atoms each attached to a silicon atom in a molecule,
    (C) 10 to 30 parts by weight of fumed silica having a BET specific surface area of 50 to 400 m$^2$/g,
    (D) 0.1 to 3 parts by weight of carbon black having a BET specific surface area of 30 to 120 m$^2$/g, an iodine adsorption value of 30 to 120 mg/g, and a DBP absorption value of 100 to 200 ml/100 g,
    (E) a catalytic amount of an addition reaction catalyst, and
    (F) at least one component selected from the group consisting of fillers, internal parting agents, tackifiers and thixotropic agents,
    said alkenyl-containing liquid organopolysiloxane (A) being a mixture of at least two liquid organopolysiloxanes having different weight average molecular weights.

9. The separator seal of claim 8 wherein in the liquid organopolysiloxane (A), at least 90 mol % of the entire organic groups attached to silicon atoms are methyl.

10. The separator seal of claim 8 wherein a molar ratio of Si—H groups in component (B) to alkenyl groups in component (A) is between 0.8:1 and 5.0:1.

11. The separator seal of claim 8 wherein the at least two liquid organopolysiloxanes having different weight average molecular weights includes a first liquid organopolysiloxane (A-1) which is present in the greatest amount and a second liquid organopolysiloxane (A-2) which is present in the second greatest amount, the first and second liquid organopolysiloxanes have a weight average molecular weight Mw(A-1) and Mw(A-2), respectively, which falls in the range: $2 \leq Mw(A-2)/Mw(A-1) \leq 10$.

12. The separator seal of claim 8 wherein the at least two liquid organopolysiloxanes having different weight average molecular weights includes a first liquid organopolysiloxane (A-1) which is present in the greatest amount and a second liquid organopolysiloxane (A-2) which is present in the second greatest amount, the first liquid organopolysiloxane has a weight average molecular weight Mw(A-1) of 10,000 to less than 30,000 and the second liquid organopolysiloxane has a weight average molecular weight Mw(A-2) of 30,000 to 100,000.

13. A separator seal for use in polymer electrolyte fuel cells which is formed of a sealing composition in the cured state, said sealing composition consisting essentially of:
    (A) 100 parts by weight of a liquid organopolysiloxane containing at least two alkenyl groups each attached to a silicon atom in a molecule,
    (B) 0.5 to 20 parts by weight of an organohydrogenpolysiloxane containing at least three hydrogen atoms each attached to a silicon atom in a molecule,
    (C) 10 to 30 parts by weight of fumed silica having a BET specific surface area of 50 to 400 m$^2$/g,
    (D) 0.1 to 3 parts by weight of carbon black having a BET specific surface area of 30 to 120 m$^2$/g, an iodine adsorption value of 30 to 120 mg/g, and a DBP absorption value of 100 to 200 ml/100 g,
    (E) a catalytic amount of an addition reaction catalyst, and
    (F) at least one component selected from the group consisting of fillers, internal parting agents, tackifiers and thixotropic agents,
    said alkenyl-containing liquid organopolysiloxane (A) being a mixture of at least two liquid organopolysiloxanes having different weight average molecular weights.

14. A separator for use in polymer electrolyte fuel cells comprising a substrate comprising a metal thin plate or a conductive powder and a binder and a seal formed at a periphery on at least one surface of the substrate, said seal comprising the separator seal of claim 8.

15. A separator for use in polymer electrolyte fuel cells comprising a substrate comprising a metal thin plate or a conductive powder and a binder and a seal formed at a periphery on at least one surface of the substrate, said seal comprising the separator seal of claim 13.

* * * * *